United States Patent
Park et al.

(10) Patent No.: US 10,050,772 B2
(45) Date of Patent: Aug. 14, 2018

(54) METHOD AND APPARATUS FOR GENERATING STANDARD PATTERN FOR DATA SIGNALS

(71) Applicant: SAMSUNG SDS CO., LTD., Seoul (KR)

(72) Inventors: In Suk Park, Seoul (KR); Sang Joon Sun, Seoul (KR); Seung Jun Lee, Seoul (KR); Dae Jung Ahn, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 15/460,367

(22) Filed: Mar. 16, 2017

(65) Prior Publication Data

US 2017/0272233 A1    Sep. 21, 2017

(30) Foreign Application Priority Data

Mar. 17, 2016    (KR) .................. 10-2016-0032121

(51) Int. Cl.
*H04L 7/02* (2006.01)
*H04L 7/00* (2006.01)

(52) U.S. Cl.
CPC .............. *H04L 7/02* (2013.01); *H04L 7/0041* (2013.01)

(58) Field of Classification Search
CPC .............. G05B 23/024; G05B 23/0229; G05B 23/0283; G01R 31/31726; G06F 11/263; G21C 17/00; Y10T 29/49155; H04L 7/02; H04L 7/0041
See application file for complete search history.

(56) References Cited

U.S. PATENT DOCUMENTS

| | | | |
|---|---|---|---|
| 7,421,351 B2 * | 9/2008 | Navratil | G05B 23/024 702/185 |
| 8,378,816 B2 * | 2/2013 | Wagner | G05B 23/0229 340/540 |
| 2011/0173497 A1 * | 7/2011 | Nakatani | G05B 19/0428 714/32 |

FOREIGN PATENT DOCUMENTS

| | | |
|---|---|---|
| JP | 2003-258694 A | 9/2003 |
| JP | 3929471 B2 | 6/2007 |
| KR | 10-2006-0035316 A | 4/2006 |

* cited by examiner

*Primary Examiner* — Vineeta Panwalkar
(74) *Attorney, Agent, or Firm* — Sughrue Mion, PLLC (57) ABSTRACT

Methods and apparatus for generating a standard pattern for data signals from a set of multiple data signals are provided. The standard pattern consists of a signal length, a centerline, an upper limit, and a lower limit. One of methods comprises, receiving first and second data signals, determining a standard pattern length for each of the first and second data signals, sampling each of the first and second data signals by as much as the determined standard pattern length, aligning the sampled first and second data signals, and generating a standard pattern for the first and second data signals by overlapping the aligned first and second data signals, wherein the generated standard pattern is a standard pattern having reflected thereinto upper and lower limit ranges that are determined using levels of the aligned first and second data signals.

14 Claims, 10 Drawing Sheets

METHOD AND APPARATUS FOR GENERATING STANDARD PATTERN FOR DATA SIGNALS

This application claims priority to Korean Patent Application No. 10-2016-0032121, filed on Mar. 17, 2016, and all the benefits accruing therefrom under 35 U.S.C. § 119, the disclosure of which is incorporated herein by reference in its entirety.

BACKGROUND

1. Field

The present disclosure relates to a method and apparatus for generating a standard pattern for data signals, and more particularly, to a method and apparatus for generating a standard pattern for data signals collected from the sensors of devices.

2. Description of the Related Art

In a manufacturing environment in which a manufacturing process such as a semiconductor process is performed in several stages, it is necessary to determine whether each of the stages is performed normally for quality control. To this end, a manufacturing device that performs each step of the manufacturing process has a sensor that detects whether the manufacturing device operates normally. The administrator of the manufacturing process can determine whether the manufacturing device operates normally by analyzing a sensing signal collected by the sensor.

However, in a case in which the manufacturing process such as a semiconductor process is carried out through a large-scale production line in a time series, it is important to quickly determine whether the manufacturing device performing each step of the manufacturing process operates normally. For this reason, a method may be considered in which a standard pattern is generated for collected sensing signals and is used as a criterion for determining whether the manufacturing device operates normally. When there already exists the standard pattern, the administrator of the manufacturing process can intuitively and quickly determine whether any abnormality has occurred in the manufacturing device, simply by comparing the standard pattern and a target signal.

However, a method of generating a standard pattern for sensing signals that are repeated with a delay by performing time correction on the sensing signals has not yet been provided. Particularly, a method capable of reflecting a difference between the levels of sensing signals into a standard pattern has not yet been provided.

Thus, there arises a problem that in response to a signal having a different level from a standard pattern being detected, it is determined that an abnormality has occurred in the manufacturing device even if the detected signal is within a predetermined allowable range. This type of problem results in frequent downtimes and restarts in a manufacturing environment with a large production line, leading to deterioration of productivity.

SUMMARY

Exemplary embodiments of the present disclosure provide a method and apparatus for generating a standard pattern for a plurality of data signals.

More specifically, exemplary embodiments of the present disclosure provide a method and apparatus for generating an optimum standard pattern by aligning data signals that are repeated with a delay therebetween.

Exemplary embodiments of the present disclosure also provide a method and apparatus for generating a standard pattern having reflected thereinto the upper and lower limits of an allowable range for collected data signal values.

Exemplary embodiments of the present disclosure also provide a method and apparatus for determining whether each device sending a data signal to an administrator operates normally by comparing a standard pattern with the data signal sent by each device.

However, exemplary embodiments of the present disclosure are not restricted to those set forth herein. The above and other exemplary embodiments of the present disclosure will become more apparent to one of ordinary skill in the art to which the present disclosure pertains by referencing the detailed description of the present disclosure given below.

According to an exemplary embodiment of the present disclosure, a method of generating a standard pattern for data signals, comprises, receiving first and second data signals, determining a standard pattern length for each of the first and second data signals, sampling each of the first and second data signals by as much as the determined standard pattern length, aligning the sampled first and second data signals, and generating a standard pattern for the first and second data signals by overlapping the aligned first and second data signals, wherein the generated standard pattern is a standard pattern having reflected thereinto upper and lower limit ranges that are determined using levels of the aligned first and second data signals. According to an exemplary embodiment of the present disclosure, a method of generating a standard pattern for data signals, comprises, receiving first and second data signals, determining a standard pattern length for each of the first and second data signals, sampling each of the first and second data signals by as much as the determined standard pattern length, aligning the sampled first and second data signals, and generating a standard pattern for the first and second data signals by overlapping the aligned first and second data signals, wherein the generated standard pattern is a standard pattern having reflected thereinto upper and lower limit ranges that are determined using levels of the aligned first and second data signals.

According to an exemplary embodiment of the present disclosure, an apparatus for generating a standard pattern for data signals, comprises, at least one processor, a network interface receiving data signals, a memory loading a computer program, which is to be executed by the processor, and a storage storing the computer program and levels of the data signals, wherein the computer program comprises an operation of receiving first and second data signals, an operation of determining a standard pattern length for each of the first and second data signals, an operation of sampling each of the first and second data signals by as much as the determined standard pattern length, an operation of aligning the sampled first and second data signals, and an operation of generating a standard pattern for the first and second data signals by overlapping the aligned first and second data signals, and the generated standard pattern is a standard pattern having reflected thereinto upper and lower limit ranges that are determined using levels of the aligned first and second data signals.

According to an exemplary embodiment of the present disclosure, a computing program coupled to a computing device to execute a method of generating a standard pattern for data signals, and stored in non-transitory computer readable recording medium, the program is configured to executes an operation of receiving first and second data signals, an operation of determining a standard pattern length for each of the first and second data signals, an operation of sampling each of the first and second data signals by as much as the determined standard pattern length, an operation of aligning the sampled first and second data signals, and an operation of generating a standard pattern for the first and second data signals by overlapping the aligned first and second data signals, wherein the generated standard pattern is a standard pattern having reflected thereinto upper and lower limit ranges that are determined using levels of the aligned first and second data signals.

According to the aforementioned and other exemplary embodiments of the present disclosure, a standard pattern for determining whether each device is in an abnormal state can be provided. More specifically, a method of determining whether each device operates normally by receiving a data signal from each device and comparing the data signal with the standard pattern can be provided.

Also, an apparatus capable of monitoring whether each device operates normally can be provided. Also, an apparatus capable of controlling the operating state of each device when they do not operate normally can be provided.

Also, a method of generating a standard pattern by eliminating any time distortion phenomenon that may be caused by delays in data signals that are repeatedly received.

Also, a method of generating a standard pattern having reflected thereinto upper and lower limits determined in consideration of an allowable range for data signal levels can be provided.

Other features and exemplary embodiments may be apparent from the following detailed description, the drawings, and the claims.

BRIEF DESCRIPTION OF THE DRAWINGS

The above and other exemplary embodiments and features of the present disclosure will become more apparent by describing in detail exemplary embodiments thereof with reference to the attached drawings, in which.

DETAILED DESCRIPTION

Figure 1:
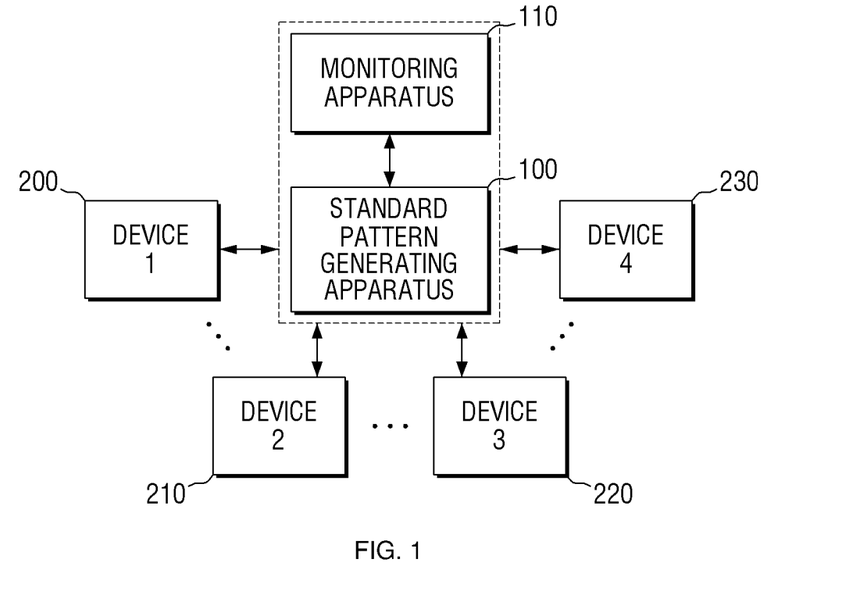
FIG. 1 is a block diagram of a system for generating a standard pattern according to an exemplary embodiment of the present disclosure.

FIG. 1 is a block diagram of a system for generating a standard pattern according to an exemplary embodiment of the present disclosure. Referring to FIG. 1, the system may include an apparatus 100 (hereinafter, "the standard pattern generating apparatus 100 ") for generating a standard pattern, a monitoring apparatus 110, and a plurality of devices, i.e., device 1 (200), device 2 (210), device 3 (220), and device 4 (230). The system is illustrated in FIG. 1 as including four devices, but the present disclosure is not limited thereto. That is, the system may include more than four devices or less than four devices. For example, the system may include only one device.

The standard pattern generating apparatus 100 is a computing device capable of communicating with the other elements of the system. The standard pattern generating apparatus 100 may receive data signals from the devices 200, 210, 220, and 230. The standard pattern generating apparatus 100 may generate a standard pattern by collecting the data signals received from the devices 200, 210, 220, and 230.

For example, the standard pattern generating apparatus 100 may repeatedly receive data signals from device 1 (210) and may generate a standard pattern for the received data signals. The standard pattern generating apparatus 100 may also generate a standard pattern for data signals received from each of device 2 (210), device 3 (220), and device 4 (230).

That is, the standard pattern generating apparatus 100 may receive a plurality of data signals from all or each of the devices 200, 210, 220, and 230. Once more than a predetermined number of data signals are received, the standard pattern generating apparatus 100 may generate a standard pattern for the received data signals through statistical analysis.

Data signals that the standard pattern generating apparatus 100 may receive from the devices 200, 210, 220, and 230 may be discrete signals. For example, the data signals that the standard pattern generating apparatus 100 may receive from the devices 200, 210, 220, and 230 may be discrete signals associated with sensing values detected from the devices 200, 210, 220, and 230, but the present disclosure is not limited thereto. That is, alternatively, the data signals that the standard pattern generating apparatus 100 may receive from the devices 200, 210, 220, and 230 may be continuous signals.

The standard pattern generating apparatus 100 may store a standard pattern for data signals received from each of the devices 200, 210, 220, and 230. Then, the standard pattern generating apparatus 100 may provide the generated standard pattern to the monitoring apparatus 110.

The monitoring apparatus 110 may be a computing device capable of communicating with the standard pattern generating apparatus 100 and the devices 200, 210, 220, and 230. More specifically, the monitoring apparatus 110 may receive and display the standard pattern generated by the standard pattern generating apparatus 100.

The monitoring apparatus 110 may receive data signals from each of the devices 200, 210, 220, and 230. More specifically, the monitoring apparatus 110 may receive data signals from each of the devices 200, 210, 220, and 230 via the standard pattern generating apparatus 100. Also, the monitoring apparatus 110 may display image data for comparing the received data signals with the standard pattern generated by the standard pattern generating apparatus 100.

The monitoring apparatus 110 and the standard pattern generating apparatus 100 are illustrated in FIG. 1 as being separate from each other, but the present disclosure is not limited thereto. At least one of the standard pattern generating apparatus 100 and the monitoring apparatus 110 may control the operation of each of the devices 200, 210, 220, and 230 in the system. For example, the standard pattern generating apparatus 100 may terminate the operation of device 1 (200). In another example, in a case in which device 2 (210) is not in operation, the standard pattern generating apparatus 100 may control device 2 (210) to resume its operation. To control each of the devices 200, 210, 220, and 230, the standard pattern generating apparatus 100 may send a control command to each of the devices 200, 210, 220, and 230.

Each of the devices 200, 210, 220, and 230 may perform a predetermined process or some steps of the predetermined process. Each of the devices 200, 210, 220, and 230 may include a communication module for communicating with the standard pattern generating apparatus 100 and the monitoring apparatus 110. Each of the devices 200, 210, 220, and 230 may further include a sensor for sensing whether the corresponding device operates normally. Each of the devices 200, 210, 220, and 230 may further include an additional sensor for sensing the internal environment and/or the external environment of the corresponding device and the state of a product being manufactured in the corresponding device.

Each of the devices 200, 210, 220, and 230 may transmit the result of sensing performed by their sensor to the standard pattern generating apparatus 100 in the form of data signals.

For example, the devices 200, 210, 220, and 230 may be various types of devices for use in a semiconductor manufacturing process. In this example, the devices 200, 210, 220, and 230 may be devices that sequentially perform steps of the semiconductor manufacturing process. That is, the steps of the semiconductor manufacturing process may be sequentially performed in device 1 (200), device 2 (210), device 3 (220), and device 4 (230), and the standard pattern generating apparatus 100 may receive various sensing information detected by the sensor of each of the devices 200, 210, 220, and 230 in the form of data signals.

If each of the devices 200, 210, 220, and 230 is equipped with multiple sensors, the standard pattern generating apparatus 100 may generate a standard pattern for data signals collected from each of the multiple sensors. Alternatively, the standard pattern generating apparatus 100 may generate a standard pattern for combinations of data signals collected from the multiple sensors.

Figure 2:
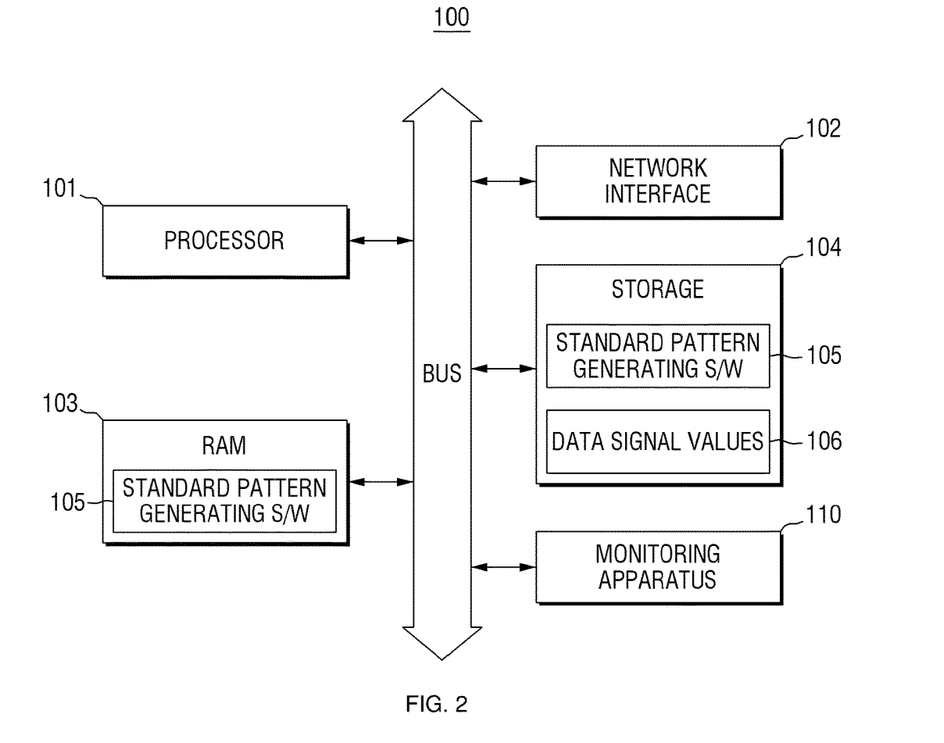
FIG. 2 is a block diagram of an apparatus for generating a standard pattern according to an exemplary embodiment of the present disclosure.

FIG. 2 is a block diagram of a standard pattern generating apparatus according to an exemplary embodiment of the present disclosure. The structure and operation of the standard pattern generating apparatus 100 will hereinafter be described with reference to FIG. 2.

Referring to FIG. 2, the standard pattern generating apparatus 100 may include at least one processor 101, a network interface 102, which receives data signals, a memory 103, which loads a computer program that is to be executed by the processor 101, and a storage 104, which stores the computer program and the values of the data signals. The standard pattern generating apparatus 100 may further include the monitoring apparatus 110, which displays a standard pattern and image data for comparing the standard pattern and each target data signal. FIG. 2 illustrates the monitoring apparatus 110 as being a part of the standard pattern generating apparatus 100, whereas FIG. 1 illustrates the standard pattern generating apparatus 100 and the monitoring apparatus 110 as being separate from each other.

The processor 101 controls the overall operation of each of the elements of the standard pattern generating apparatus 100. The processor 101 may include a Central Processing Unit (CPU), a Micro Processor Unit (MPU), a Micro Controller Unit (MCU), or another arbitrary processor that is already well known. The processor 101 may execute at least one application or program for executing a method of generating a standard pattern according to an exemplary embodiment of the present disclosure. The standard pattern generating apparatus 100 may include more than one processor 101.

The network interface 102 supports wired and wireless Internet communication modes for the standard pattern generating apparatus 100. The network interface 102 may also support various communication modes other than the wired and wireless Internet communication modes. To this end, the network interface 102 may include a communication module that is already well known.

The network interface 102 may transmit data to, and receive data from, the devices 200, 210, 220, and 230 of FIG. 1 through a network. More specifically, the network interface 102 may receive data signals from each of the devices 200, 210, 220, and 230. Also, the network interface 102 may transmit a control command for controlling the operation of each of the devices 200, 210, 220, and 230 to the corresponding device.

The memory 103 stores various data, commands and/or information. The memory 103 may load at least one program 105 from the storage 104 to perform an automated test performing method according to an exemplary embodiment of the present disclosure. FIG. 2 illustrates a random access memory (RAM) as an example of the memory 103.

The storage 104 may non-temporarily store the program 105 and data signal values 106. FIG. 2 illustrates standard pattern generating software as an example of the program 105.

The data signal values 106 may be, for example, sensing values measured by the sensor of each of the devices 200, 210, 220, and 230 and showing whether each of the devices 200, 210, 220, and 230 operates normally. The standard pattern generation apparatus 100 may receive the sensing values in the form of data signals and may store the values of the received data signals. The term "the value of a data signal" or "data signal value", as used herein, may also be referred to as the level of a data signal or a data signal level.

The storage 104 may be a nonvolatile memory such as a Read Only Memory (ROM), an Erasable Programmable ROM (EPROM), an Electrically Erasable Programmable ROM (EEPROM), or a flash memory, a hard disk, a removable disk, or any type of computer-readable recording medium that is already well known.

In response to a third data signal being received via the network interface 102 after the generation of the standard pattern, the monitoring apparatus 110 displays information indicating whether the value of the third data signal falls within an upper or lower limit range of the standard pattern. Alternatively, the monitoring apparatus 110 may output a notification signal indicating whether the value of the third data signal falls within the upper or lower limit range of the standard pattern through the output of a particular audio device or a light source.

If the value of the third data signal does not fall within the upper or lower limit range of the standard pattern, the monitoring apparatus 110 may display a user interface for controlling the device that has sent the third data signal. The monitoring apparatus 110 may be configured to include at least one of a display module, an audio device, and a light source that are already well known.

In response to a command to terminate the operation of the device that has sent the third data signal being received via the user interface, the monitoring apparatus 110 may send the received command to the device that has sent the third data signal.

A method of generating a standard pattern, performed by the standard pattern generating apparatus 100, will hereinafter be described with reference to FIG. 3.

Figure 3:
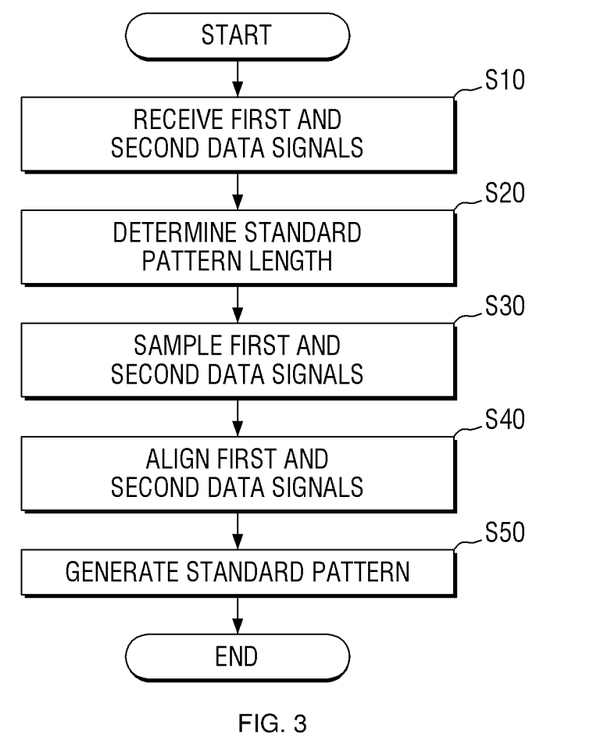
FIG. 3 is a flowchart illustrating a method of generating a standard pattern according to an exemplary embodiment of the present disclosure.

FIG. 3 is a flowchart illustrating a method of generating a standard pattern according to an exemplary embodiment of the present disclosure. The standard pattern generating apparatus 100 may execute the standard pattern generating software 105 to perform steps of the method of generating a standard pattern.

It is assumed that the standard pattern generating apparatus 100 generates a standard pattern using first and second data signals, but the present disclosure is not limited thereto. That is, the use of the first and second data signals to generate a standard pattern should be interpreted that multiple data signals can be used by the standard pattern generating apparatus 100 to generate a standard pattern. For example, the standard pattern generating apparatus 100 may receive a predefined number of data signals, for example, N data signals, to attain statistical significance and may generate a standard pattern using the N data signals.

Referring to FIG. 3, the standard pattern generating apparatus 100 may receive first and second data signals (S10). The first and second data signals may be data signals received at different points of time by the standard pattern generating apparatus 100.

The standard pattern generating apparatus 100 may determine a standard pattern length for each of the first and second data signals (S20). The standard pattern generating apparatus 100 may sample each of the first and second data signals by as much as the determined standard pattern length (S30).

S20 and S30 will hereinafter be described with reference to FIG. 4.

Figure 4:
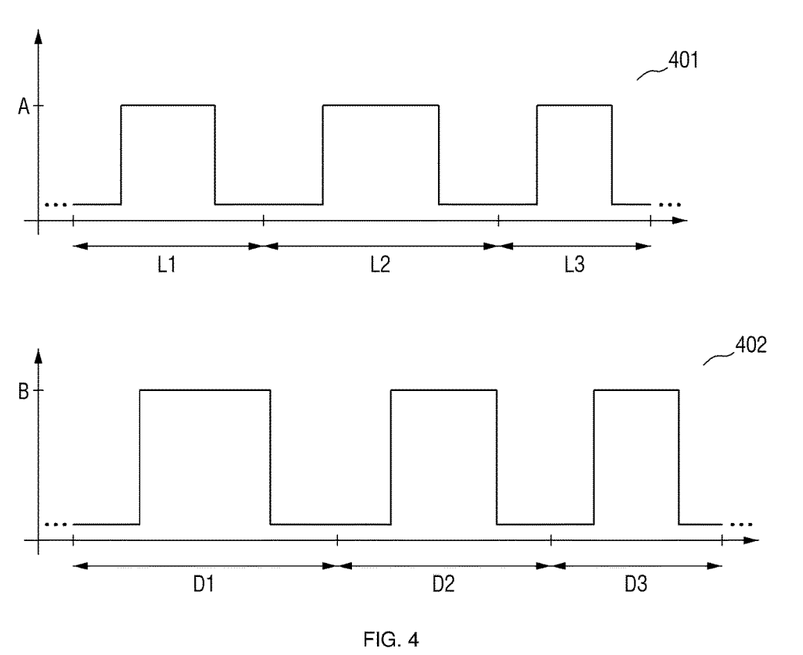
FIG. 4 illustrates exemplary data signals according to some exemplary embodiments of the present disclosure.

FIG. 4 illustrates exemplary data signals according to some exemplary embodiments of the present disclosure.

Referring to FIG. 4, it is assumed that data signals 401 and 402 are signals transmitted by the same device and received by the standard pattern generating apparatus 100.

The data signal 401 includes a signal having a length L1, a signal having a length L2, and a signal having a length L3, and the signal having the length L1, the signal having the length L2, and the signal having the length L3 all have the same level, i.e., a level A.

The data signal 402 includes a signal having a length D1, a signal having a length D2, and a signal having a length D3, and the signal having the length D1, the signal having the length D2, and the signal having the length D3 all have the same level, i.e., a level B.

The lengths L1, L2, L3, D1, D2, and D3 may all differ from one another, or some of the lengths L1, L2, L3, D1, D2, and D3 may be identical.

The standard pattern generating apparatus 100 may determine a standard pattern length for the signals included in the data signal 401. The standard pattern generating apparatus 100 may also determine a standard pattern length for the signals included in the data signal 402. The standard pattern length for the data signal 401 or 402 may be determined based on at least one of the average of the lengths of the signals included in the data signal 401 or 402, the median of the lengths of the signals included in the data signal 401 or 402, and an exponential weighted moving average of the lengths of the signals included in the data signal 401 or 402, calculated in consideration the order of the creation of the corresponding signals. Alternatively, the standard pattern length for the data signal 401 or 402 may be determined by other arbitrary methods that are already well known.

It will hereinafter be described how to determine the standard pattern length for the data signal 401 or 402 using the median of the lengths of the signals included in the data signal 401 or 402. If the length L1 is the median of the lengths L1, L2, and L3, the length L1 may be determined as the standard pattern length for the data signal 401. Also, if the length D2 is the median of the lengths D1, D2, and D3, the length D2 may be determined as the standard pattern length for the data signal 402.

Then, the standard pattern generating apparatus 100 may sample the data signal 401 using the length L1, which is determined as the standard pattern length for the data signal 401. Also, the standard pattern generating apparatus 100 may sample the data signal 402 using the length D2, which is determined as the standard pattern length for the data signal 402.

Referring again to FIG. 3, the standard pattern generating apparatus 100 may align the sampled first and second data signals (S40).

Thereafter, the standard pattern generating apparatus 100 may generate a standard pattern for the first and second data signals (S50) by overlapping the aligned first and second data signals. The generated standard pattern may be a standard pattern having reflected thereinto upper and lower limit ranges determined based on the levels of the aligned first and second data signals.

The alignment of the first and second data signals and the generation of a standard pattern using the levels of the first and second data signals will hereinafter be described with reference to FIGS. 5 and 6.

Figure 5:
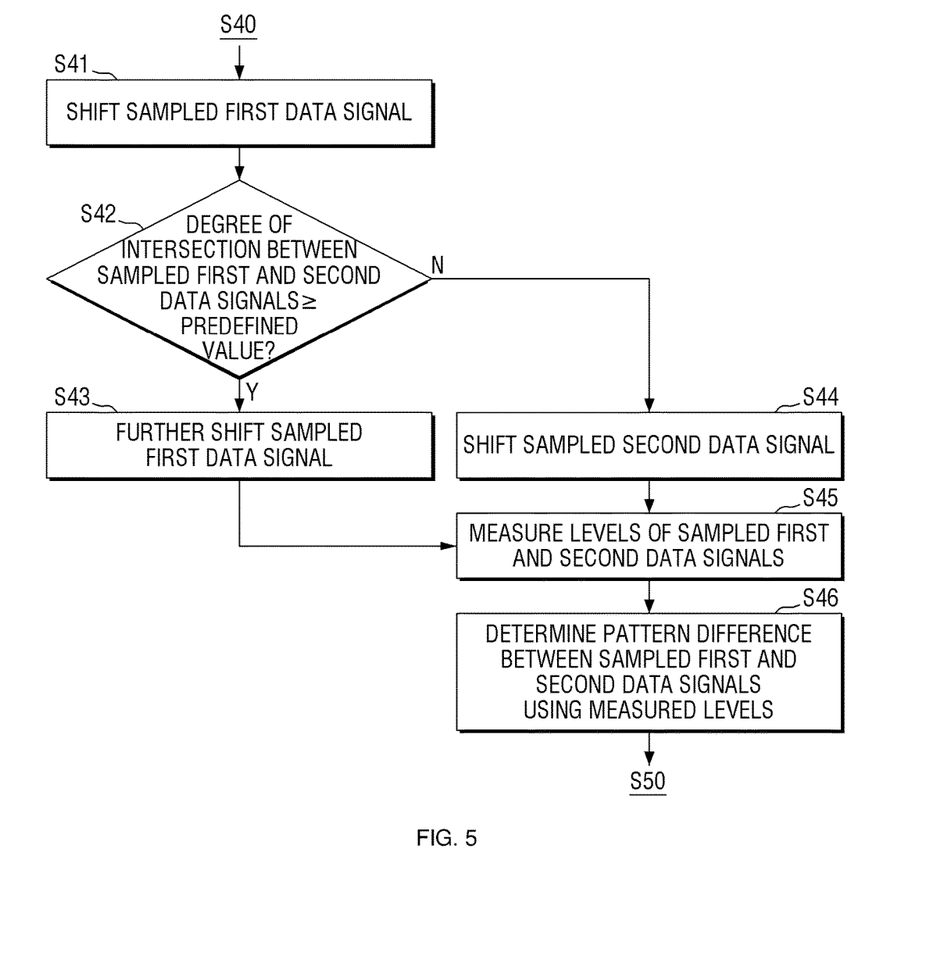
FIG. 5 is a flowchart illustrating a method of aligning data signals according to an exemplary embodiment of the present disclosure.

FIG. 5 is a flowchart illustrating a method of aligning data signals according to an exemplary embodiment of the present disclosure.

Referring to FIG. 5, the standard pattern generating apparatus 100 may shift the sampled first data signal by a predetermined period of unit time (S41).

That is, since the sampled first and second data signals are in a "delay" relationship, the sampled first and second data signals need to be aligned. First, the alignment of the sampled first and second data signals in a case in which the first data signal is a delayed signal will hereinafter be described. It is assumed that t=1 (where t denotes the predetermined period of unit time).

For convenience, the first and second data signals will hereinafter be referred to as data signals X and Y, respectively. The data signals X and Y are discrete signals and may be represented as follows: $X=(X_1, X_2, \ldots, X_t)$ and $Y=(Y_1, Y_2, \ldots, Y_u)$ where $t \leq u$. Since the data signals X and Y may have a different length from each other, t and u may have a different value from each other.

$X_t$ is the value of the data signal X received from a predetermined device at a time t. The term "the value of a data signal" or "data signal value", as used herein, may also be referred to as the level of a data signal or a data signal level. In response to the data signals X and Y being received, the standard pattern generating apparatus 100 may generate signals X' and Y' by copying the data signals X and Y.

The standard pattern generating apparatus 100 may shift the signal X' to the left by 1 at a time depending on the degree to which the data signal X is delayed relative to data signal Y. Since the data signal X is a delayed signal, the signal X' may be shifted to the left by 1 at a time so as to eliminate the delay between the data signals X and Y and to align the signal X' with the data signal Y.

The degree to which a discrete signal such as the data signal X is delayed relative to another discrete signal such as the data signal Y may be represented by the number of times the data signal X is delayed relative to the data signal Y. The number of times the data signal X is delayed may be determined by the following equation: $(d_X:=0)d_X:=d_X+1$. A signal value obtained by shifting the signal X' may be expressed by the following equation: $X'_t:=X'_{t+1}$. Since the shift of the signal X' is counted once in the number of times the data signal X is delayed, $X'_1$ is eliminated from the signal X'. That is, due to the delay of the data signal X, the signal X" has a length of t−1.

The standard pattern generating apparatus 100 may measure the levels of the signal X' and the data signal Y. The signal X' is a signal having a delay reflected thereinto. The levels of the signal X' and the data signal Y may indicate the values of the signal X' and the data signal Y at the time t, i.e., $X'_t$ and $Y_t$.

The standard pattern generating apparatus 100 may determine a pattern difference between the data signals X and Y using the measured levels of the signal X' and the data signal Y. By using the pattern difference between the data signals X and Y, the standard pattern generating apparatus 100 may align the data signals X and Y. It will hereinafter be described how to determine the pattern difference between the data signals X and Y.

In a case in which the data signal X is a delayed signal, the standard pattern generating apparatus 100 measures the levels of the signal X' and the data signal Y. Then, the standard pattern generating apparatus 100 may determine the number of times the signal X' is shifted when the difference between the measured levels of the signal X' and the data signal Y is minimized.

Thereafter, by using the number of times the signal X' is shifted, the standard pattern generating apparatus 100 may align the data signal X with the data signal Y.

More specifically, while the signal X' is being shifted, the standard pattern generating apparatus 100 may calculate and record a level difference $d(X_T, Y_T)$ between the signal X' and the data signal Y using the measured levels of the signal X' and the data signal Y, as shown in Equation (1):

$$d(X_T, Y_T) = |X_T - Y_T| \quad (1)$$

The standard pattern generating apparatus 100 searches for and finds a minimum among values of $d(X_T, Y_T)$ that are recorded while the signal X' is being shifted and may determine the number of times the data signal X is delayed based on the found minimum, i.e., find the value of $d_X$ corresponding to the found minimum.

By reflecting the number of times the data signal X is delayed, the data signal X may be aligned as follows: $X=(X_{dx}, X_{dx+1}, \ldots, X_t)$.

The standard pattern generating apparatus 100 may also determine the pattern difference the data signals X and Y not only by comparing the measured levels of the signal X' and the data signal Y, but also by taking the correlation between the data signals X and Y into consideration.

A coefficient of the correlation between the data signals X and Y may be calculated using Equation (2):

$$CORT(X_T, Y_T) = \frac{\sum_{t=1}^{T-1}(X_{t+1} - X_t)(Y_{t+1} - Y_t)}{\sqrt{\sum_{t=1}^{T-1}(X_{t+1} - X_t)^2}\sqrt{\sum_{t=1}^{T-1}(Y_{t+1} - Y_t)^2}} \quad (2)$$

The standard pattern generating apparatus 100 may determine the pattern difference between the data signals X and Y by calculating the difference between the levels of the data signals X and Y using Equation (1) and calculating the coefficient of the correlation between the data signals X and Y using Equation (2).

More specifically, the pattern difference between the data signals X and Y may be calculated using Equation (3):

$$D(X_T, Y_T) = \emptyset_k[CORT(X_T, Y_T)] \cdot d(X_T, Y_T)/N^4 \quad (3)$$

where N denotes the length by which the first and second data signals overlap each other. Referring to Equation (3), the coefficient of the correlation between the data signals X and Y, calculated by Equation (2), is replaced with the function $\emptyset_k$. The function $\emptyset_k$ may be expressed by Equation (4):

$$\emptyset(u) = \frac{k}{1+e^u} \quad (4)$$

where u denotes the result of Equation (2) and k is a coefficient for clarifying the pattern difference between the data signals X and Y. The coefficient k may be experimentally determined. For example, k=2, but the present disclosure is not limited thereto.

In the above, an example in which the first data signal is a delayed signal has been described. As a result of shifting the signal X' a number of times, the signal X' and the data signal Y may be aligned with each other, but there may be times when the signal X' and the data signal Y are not aligned.

At such times, the standard pattern generating apparatus 100 may determine that the data signal Y is a delayed signal and may further shift the signal Y' to determine the pattern difference between the data signals X and Y.

If the signal X' is shifted to the end and then the signal Y' is shifted, it may take too much time to align the data signals X and Y. Accordingly, the standard pattern generating apparatus 100 may determine whether the degree of intersection between the signal X' and the data signal Y exceeds a predefined value (S42). The degree of intersection between the signal X' and the data signal Y may be determined by analyzing a trend in the levels of the signal X' and the data signal Y. This will hereinafter be described with reference to a graph 610 of FIG. 6.

Figure 6:
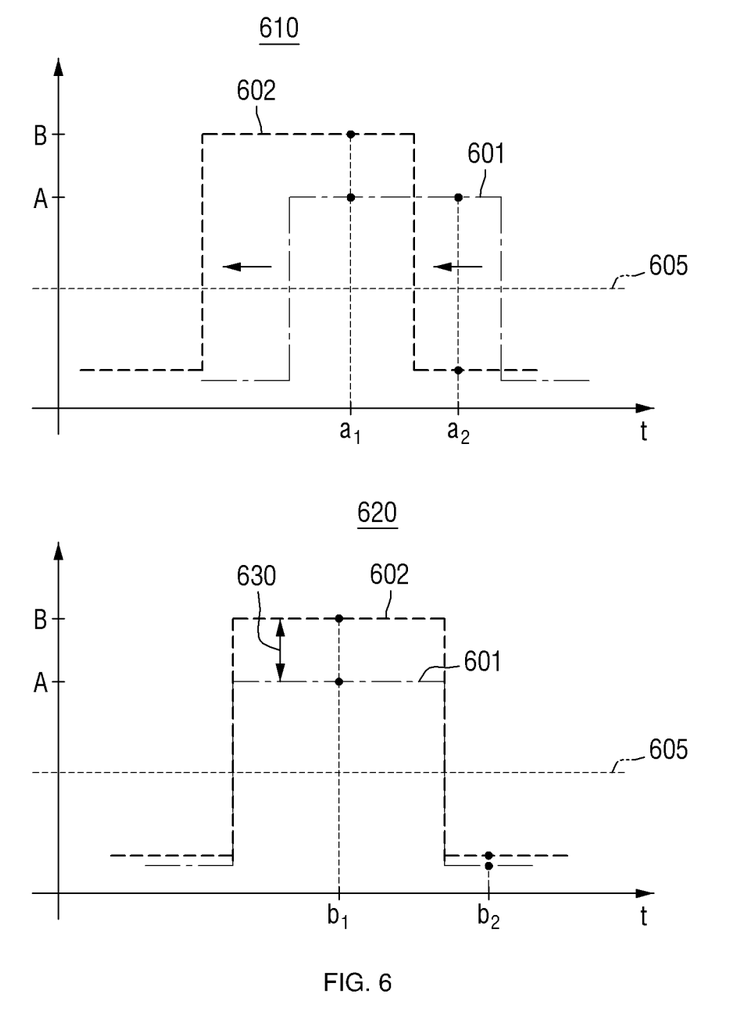
FIG. 6 illustrates the degree of intersection between two data signals according to some exemplary embodiments of the present disclosure.

FIG. 6 illustrates the degree of intersection between two data signals according to some exemplary embodiments of the present disclosure. Referring to FIG. 6, reference numerals 601 and 602 represent the sampled first and second data signals X and Y, respectively, and a dotted line 605 represents the average of the signals 601 and 602.

Referring to the graph 610 of FIG. 6, the signal 601, which is a delayed signal, is shifted to the left by 1 at a time. At a time a1, the level of the signal 601 is A, and the level of the signal 602 is B. Both the levels A and B are above the dotted line 605. In this case, the signals 601 and 602 may be expressed as intersecting each other at the time a1.

On the other hand, at a time a2, the level of the signal 601 is above the dotted line 605, but the level of the signal 602 is below the dotted line 605. In this case, the signals 601 and 602 may be expressed as not intersecting each other at the time a2.

Referring again to FIG. 5, if the degree of intersection between the signal X' and the data signal Y exceeds the predefined value, the standard pattern generating apparatus 100 may further shift the signal X' (S43).

Thereafter, after S43, the standard pattern generating apparatus 100 may measure the levels of the signal X' and the data signal Y (S45). Thereafter, the standard pattern generating apparatus 100 may determine the pattern difference between the data signals X and Y using the measured levels of the signal X' and the data signal Y (S46).

On the other hand, if the degree of intersection between the signal X' and the data signal Y does not exceed the predefined value, the standard pattern generating apparatus 100 determine that the data signal Y is a delayed signal and may shift the signal Y' (S44). Thereafter, the standard pattern generating apparatus 100 may measure the levels of the data signal X and the signal Y' (S45). The alignment of the data signals X and Y in a case in which the data signal Y is a delayed signal will hereinafter be described.

The standard pattern generating apparatus 100 may shift the signal Y' to the left by 1 at a time depending on the degree to which the data signal Y is delayed relative to the data signal X. That is, since the data signal Y is a delayed signal, the standard pattern generating apparatus 100 may search for a location where the data signal Y can become non-delayed relative to the data signal X by shifting the signal Y' to the left by 1 at a time.

The degree to which a discrete signal such as the data signal Y is delayed relative to another discrete signal such as the data signal X may be represented by the number of times the data signal Y is delayed relative to the data signal X.

The number of times the data signal Y is delayed may be determined by the following equation: $(d_Y:=0)d_Y:=d_Y+1$. A signal value obtained by shifting the signal Y' may be expressed by the following equation: $Y'_u:=Y'_{u+1}$. Since the shifting of the signal Y' is counted once in the number of times the data signal Y is delayed, $Y'_1$ is eliminated. That is, due to the delay of the data signal Y, the signal Y' has a length of u−1.

In a case in which the data signal Y is a delayed signal, Ike in a case in which the data signal X is a delayed signal, the standard pattern generating apparatus 100 may measure the levels of the sampled data signals X and Y (particularly, the levels of the data signal X and the signal Y'). Then, the standard pattern generating apparatus 100 may determine the number of times the signal Y' is shifted when the difference between the measured levels of the data signals X and the signal Y' is minimized.

Thereafter, by using the number of times the signal Y' is shifted, the standard pattern generating apparatus 100 may align the data signal Y, which is a delayed signal, with the data signal X.

The standard pattern generating apparatus 100 searches for and finds a minimum among values of $d(X_T, Y_T)$ that are recorded while the signal Y' is being shifted and may determine the number of times the data signal Y is delayed based on the found minimum, i.e., find the value of $d_Y$ corresponding to the found minimum.

By reflecting the number of times the data signal Y is delayed, the data signal X may be aligned as follows:

$$X = \left( \underbrace{NULL, NULL, \ldots, NULL}_{d_Y}, X_1, X_2, \ldots, X_t \right).$$

Figure 7:
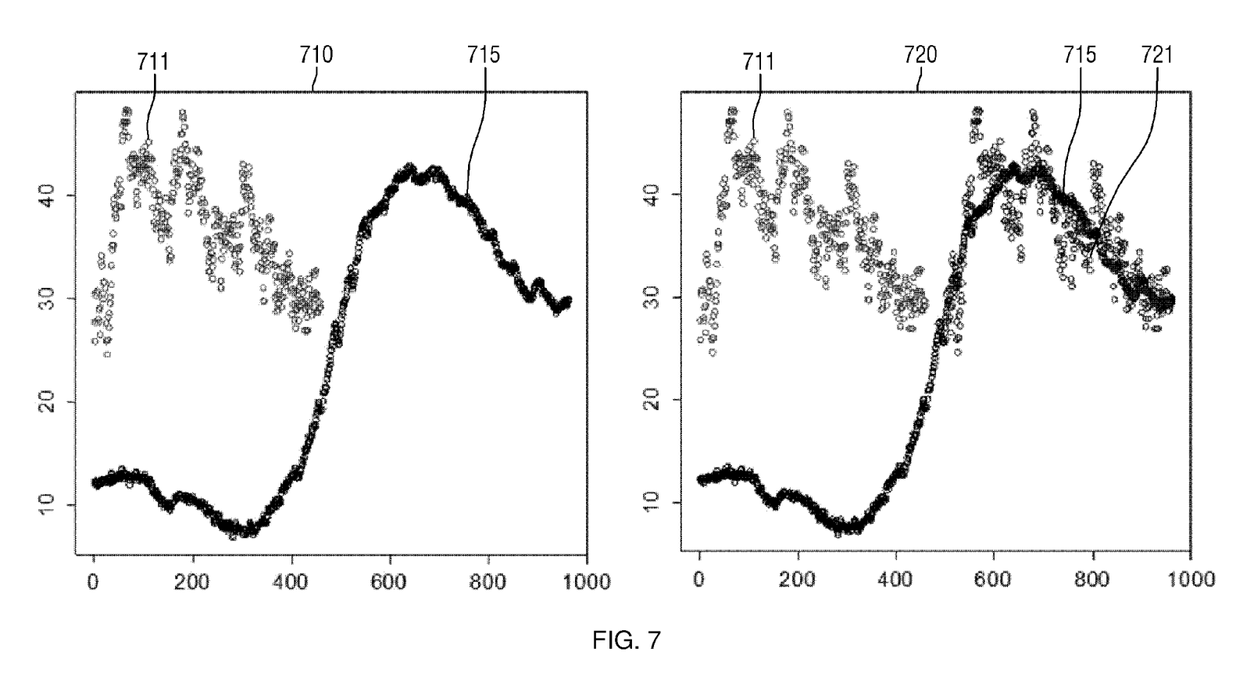
FIG. 7 illustrates the alignment of data signals according to some exemplary embodiments of the present disclosure.

FIG. 7 illustrates the alignment of data signals according to some exemplary embodiments of the present disclosure. Referring to FIG. 7, a graph 710 corresponds to a case in which a delay between first and second data signals 711 and 715 is yet to be reflected, and points on the graph 710 represent levels that each of the first and second data signals 711 and 715 may have at any given time t.

On the other hand, a graph 720 corresponds to a case in which the first data signal 711, which is a delayed signal, is aligned with the second data signal 715 through time correction. The standard pattern generating apparatus 100 may generate a standard pattern 800 of FIG. 8 with the first and second data signals 711 and 715 aligned as illustrate d in the graph 720 of FIG. 7.

Figure 8:
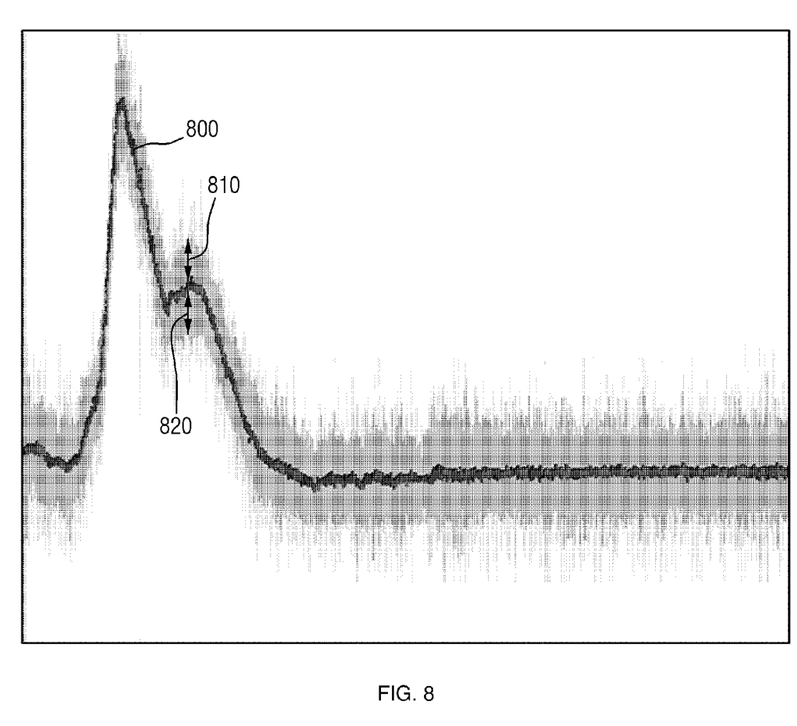
FIG. 8 illustrates an exemplary standard pattern for data signals according to some exemplary embodiments of the present disclosure.

FIG. 8 illustrates an exemplary standard pattern for data signals according to some exemplary embodiments of the present disclosure.

Referring to FIG. 8, in S50 of FIG. 3, the standard pattern generating apparatus 100 may generate the standard pattern 800. The standard pattern 800 may be a standard pattern having upper and lower limit ranges 810 and 820 reflected thereinto.

It is assumed that the standard pattern generating apparatus 100 receives the third data signal from the device that has sent the data signals X and Y. If the third data signal conforms to the standard pattern 800, the device may be determined to operate normally at the time of sending the third data signal. However, even in a case in which the third data signal does not conform to the standard pattern 800, the device may actually be operating normally. For example, even when the device operates normally, the level of the third data signal may be higher or lower than the level of the standard pattern 800 for various reasons, for example, due to a communication environment between the device and the standard pattern generating apparatus 100. Also, even if the level of the third data signal is higher or lower than the level of the standard pattern 800, the quality of processing performed by the device may still fall within an allowable range.

Thus, to properly determine whether the third data signal is a normal signal, the standard pattern generating apparatus 100 may determine the upper and lower limit ranges 810 and 820 of the standard pattern 800 within a predetermined error range. The predetermined error range is a range of values that the third data signal may have to be determined as a normal signal indicating that the device that has sent the third data signal operates normally.

The predetermined error range may be determined by statistically analyzing data signal values that are collected. For example, the standard pattern generating apparatus 100 may determine the upper and lower limit ranges 810 and 820 in consideration of at least one of the standard deviation, coefficient of variation, skewness, and kurtosis of data signal values. Alternatively, the upper and lower limit ranges 810 and 820 may be determined by the administrator of the standard pattern generating apparatus 100.

If the value of the third data signal falls within the upper or lower limit range 810 or 820, the standard pattern generating apparatus 100 may determine that the third data signal is a normal signal. That is, the standard pattern generating apparatus 100 may determine that the device that has sent the third data signal operates normally.

In the meantime, any abnormal values among data signal values received in the process of aligning the data signals X and Y may be eliminated. That is, the standard pattern generating apparatus 100 may eliminate any abnormal values having a deviation greater than a threshold from among levels of each of the first and second data signals in consideration that data signal values having a deviation greater than the threshold are likely to be received because of system error or various environmental factors. The threshold may be set by the administrator of the standard pattern generating apparatus 100. The threshold may be set to be greater than a maximum value that an abnormal signal indicating that the device that has sent the third data signal is abnormal may have.

Figure 9:
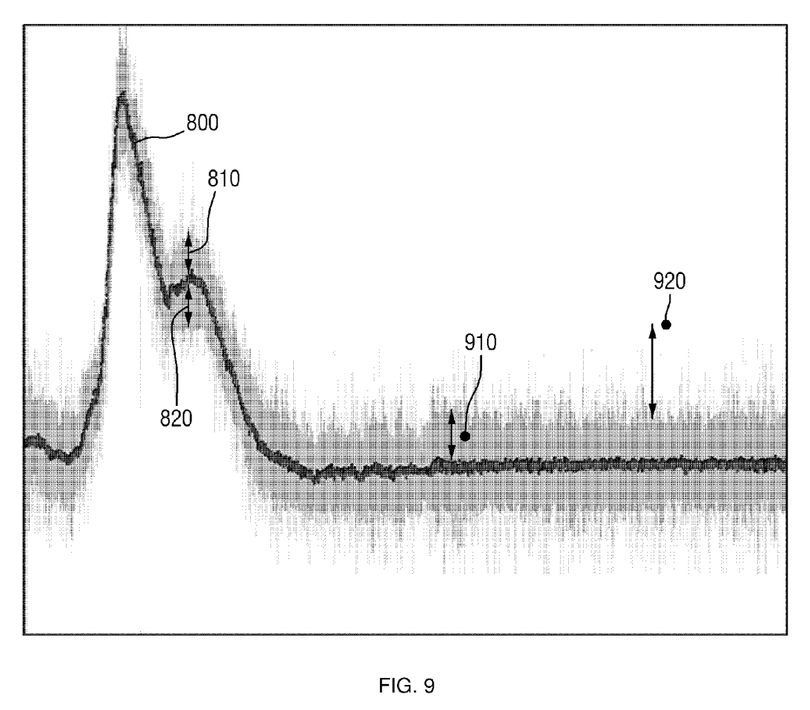
FIG. 9 illustrates the comparison of a standard pattern and a target data signal according to some exemplary embodiments of the present disclosure.

FIG. 9 illustrates the comparison of a standard pattern and a target data signal according to some exemplary embodiments of the present disclosure.

Referring to FIG. 9, after the generation of the standard pattern 800 in S50 of FIG. 3, the standard pattern generating apparatus 100 may receive the third data signal. Then, the standard pattern generating apparatus 100 may determine whether the level of the third data signal falls within the upper or lower limit range 810 or 820 of the standard pattern 800. In response to it being determined that the level of the third data signal does not fall within the upper or lower limit range 810 or 820 of the standard pattern 800, the standard pattern generating apparatus 100 may output a notification signal. The notification signal may be output in various manners (for example, through the output of a display, the output of an audio device, or the output of a light source) depending on the configuration of the monitoring apparatus 100.

The third data signal is illustrated in FIG. 9 as having a level 910 at a first point of time and having a level 920 at a second point of time, which is different from the first point of time. The level 910 may be higher than the level of the standard pattern 800, but still falls within the upper limit range 810. Thus, the device that has sent the third data signal is determined to operate normally at the first point of time.

On the other hand, the level 920 does not fall within the upper limit range 810. Thus, the device that has sent the third data signal is determined to not operate normally at the second point of time. In this case, the monitoring apparatus 110 of the standard pattern generating apparatus 100 may output a notification signal indicating that the device that has sent the third data signal is abnormal.

Figure 10:
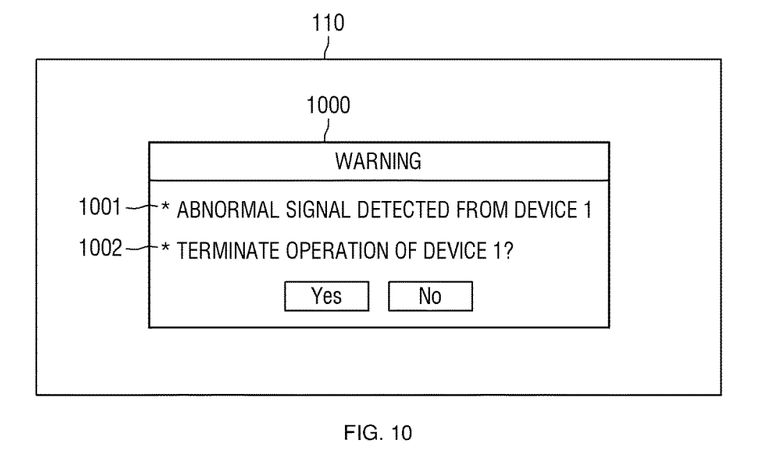
FIG. 10 illustrates an exemplary user interface for controlling a device according to some exemplary embodiments of the present disclosure.

FIG. 10 illustrates an exemplary user interface for controlling a device according to some exemplary embodiments of the present disclosure.

As described above, the standard pattern generating apparatus 100 may output a notification signal indicating that the device that has sent the third data signal, for example, device 1 (200), is abnormal via the monitoring apparatus 110. A user interface 1000 of FIG. 10 is an example of the notification signal. Referring to FIG. 10, the user interface 1000 may include information 1001 indicating that an abnormal signal has been detected from device 1 (200). The user interface 1000 may further include a region 1002 for receiving user input for controlling device 1 (100). The standard pattern generating apparatus 100 may receive user input for sending a command to terminate the operation of device 1 (200) via the region 1002. Then, the standard pattern generating apparatus 100 may send the command to terminate the operation of device 1 (200) to device 1 (200). In response to the command to terminate the operation of device 1 (200) being received, device 1 (200) may stop operating.

Figure 11:
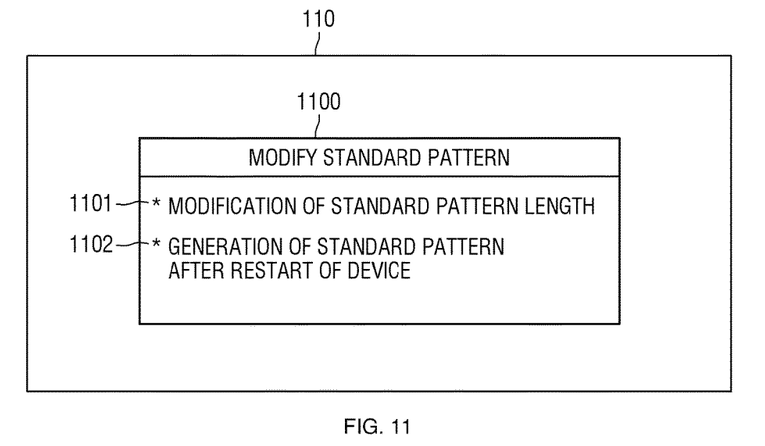
FIG. 11 illustrates an exemplary user interface for modifying a standard pattern according to some exemplary embodiments of the present disclosure.

FIG. 11 illustrates an exemplary user interface for modifying a standard pattern according to some exemplary embodiments of the present disclosure.

After the generation of a standard pattern in S50 of FIG. 3, the standard pattern generating apparatus 100 may receive a third data signal whose level does not fall within the upper or lower limit range of the standard pattern, even though the device that has sent the third data signal operates normally. For example, in a case in which error occurs in the process of determining the standard pattern length for the first and second data signals or the upper and lower limits of the standard pattern that are determined based on statistics are erroneous, the standard pattern generating apparatus 100 may receive a third data signal whose level does not fall within the upper or lower limit range of the standard pattern. These types of error may be caused by a sensor error that may occur in the device in the process of generating the standard pattern, a communication error between the standard pattern generating apparatus 100 and the device, or the use of too few data signals to generate the standard pattern.

Referring to FIG. 11, the standard pattern generating apparatus 100 may receive feedback information regarding the standard pattern. To this end, the standard pattern generating apparatus 100 may display a user interface 1100 for modifying the standard pattern via the monitoring apparatus 110. The administrator of the standard pattern generating apparatus 100 may receive the feedback information via the user interface 1100.

The feedback information may include, for example, information requesting "Modification of Standard Pattern Length" 1101 and "Generation of New Standard Pattern after Restart of Device" 1102. Although not specifically illustrated, the feedback information may also include information requesting the reacquisition of the upper and lower limits of the standard pattern.

The standard pattern generating apparatus 100 may generate a new standard pattern for the first and second data signals based on the feedback information. More specifically, in a case in which a request for the modification of a standard pattern length is received as the feedback information, the standard pattern generating apparatus 100 may perform S20 of FIG. 3 again to redetermine the standard pattern length and may generate a new standard pattern using the redetermined standard pattern length. Also, in a case in which a request for the reacquisition of upper and lower limits of a standard pattern is received as the feedback information, the standard pattern generating apparatus 100 may perform S50 of FIG. 3 again to recalculate the upper and lower limits of the standard pattern and may generate a new standard pattern using the recalculated upper and lower limits of the standard pattern. Also, in a case in which a request for the generation of a new standard pattern after the restart of a device is received as the feedback information, the standard pattern generating apparatus 100 may generate a new standard pattern after restarting the device.

What is claimed is:

1. A method, by a computing apparatus, of terminating operation of a first device of a plurality of devices when the first device operates abnormally, wherein the computing apparatus controls the first device, the method comprising:
   receiving a first data signal and a second data signal from the first device;
   determining a first standard pattern length based on application of a median or an average to the first data signal;

determining a second standard pattern length based on application of a median or an average to the second data signal;

aligning portions of the first and second data signals based on the first and second standard pattern lengths;

determining a limit based on statistical analysis of the aligned portions;

receiving a third data signal from the first device; and when a portion of the third data signal exceeds the limit:
terminating, by the computing apparatus, operation of the first device.

2. The method of claim 1, wherein the aligning comprises shifting the first data signal by a predetermined period of unit time at a time, measuring levels of the shifted first data signal and the second data signal, determining a pattern difference between the first and second data signals using the measured levels of the shifted first data signal and the second data signal, and aligning the portions of the first and second data signals using the determined pattern difference.

3. The method of claim 2, wherein the determining the pattern difference between the first and second data signals, comprises comparing the measured levels of the shifted first data signal and the second data signal, calculating a coefficient of a correlation between the first and second data signals, and determining the pattern difference between the first and second data signals using the result of the comparison and the coefficient of the correlation between the first and second data signals.

4. The method of claim 2, wherein measuring levels of the shifted first data signal and the second data signal, comprises determining a number of times the first data signal is delayed when a difference between the measured levels of the shifted first data signal and the second data signal is minimized, and aligning the first and second data signals using the determined number of times the first data signal is delayed.

5. The method of claim 2, wherein the determining the pattern difference between the first and second data signals, comprises determining a degree of intersection between the first and second data signals, further shifting the first data signal if the determined degree of intersection between the first and second data signals exceeds a predefined value, measuring levels of the further-shifted first data signal and the second data signal, and determining the pattern difference between the first and second data signals using the measured levels of the further-shifted first data signal and the second data signal.

6. The method of claim 5, wherein the determining the degree of intersection between the first and second data signals, comprises shifting the second data signal by the predetermined period of unit time at a time if the determined degree of intersection between the first and second data signals is less than the predefined value, measuring levels of the first data signal and the shifted second data signal, and determining the pattern difference between the first and second data signals using the measured levels of the first data signal and the shifted second data signal.

7. The method of claim 1, wherein, when the portion of the third data signal exceeds the limit, outputting a notification signal.

8. The method of claim 1, wherein the statistical analysis is based on at least one of a standard deviation, a coefficient of variation, a skewness, and a kurtosis.

9. The method of claim 1, wherein the first and second data signals are discrete in time.

10. An apparatus for terminating operation of a first device of a plurality of devices when the first device operates abnormally, wherein the apparatus controls the first device, the apparatus comprising:

a hardware processor;

a network interface configured to receive data signals;

a memory configured to load a computer program, which is to be executed by the hardware processor; and a storage configured to store the computer program, wherein the computer program, when executed by the hardware processor, causes the hardware processor to perform operations comprising:

receiving a first data signal and a second data sign from the first device;

determining a first standard pattern length based on application of a median or an average to the first data signal;

determining a second standard pattern length based on application of a median or an average to the second data signal;

aligning portions of the first and second data signals based on the first and second standard pattern lengths;

determining a limit based on statistical analysis of the aligned portions;

receiving a third data signal from the first device; and when a portion of the third data signal exceeds the limit:
terminating operation of the first device.

11. The apparatus of claim 10, further comprising:

a monitoring apparatus displaying information indicating whether a level of the third data signal exceeds the limit.

12. The apparatus of claim 10, wherein the statistical analysis is based on at least one of a standard deviation, a coefficient of variation, a skewness, and a kurtosis.

13. A non-transitory computer-readable storage medium storing a computer program which, when executed by a computing apparatus, causes the computing apparatus to perform a method of terminating operation of a first device of a plurality of devices when the first device operates abnormally, wherein the computing apparatus controls the first device, the method comprising:

receiving a first data signal and a second data signal from the first device;

determining a first standard pattern length based on application of a median or an average to the first data signal;

determining a second standard pattern length based on application of a median or an average to the second data signal;

aligning portions of the first and second data signals based on the first and second standard pattern lengths;

determining a limit based on statistical analysis of the aligned portions;

receiving a third data signal from the first device; and when a portion of the third data signal exceeds the limit:
terminating operation of the first device.

14. The non-transitory computer readable medium of claim 13, wherein the statistical analysis is based on at least one of a standard deviation, a coefficient of variation, a skewness, and a kurtosis.

* * * * *